Patented Jan. 13, 1925.

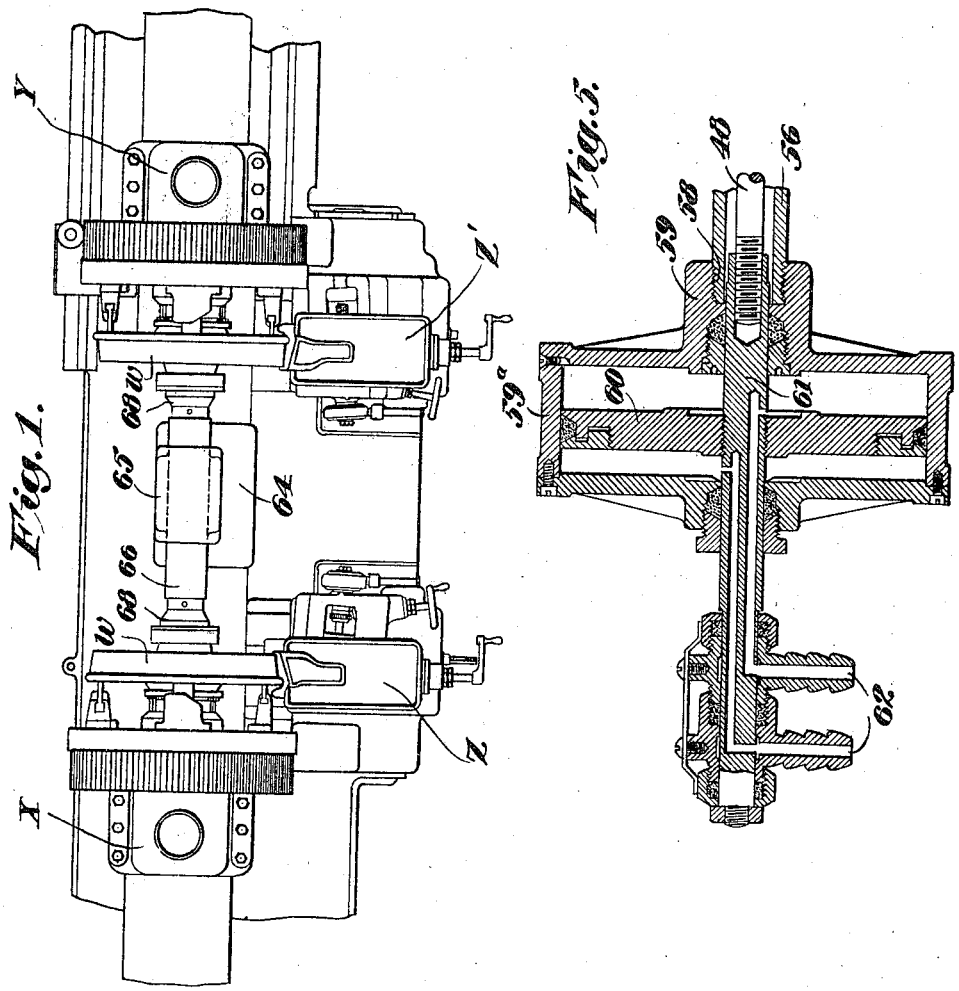

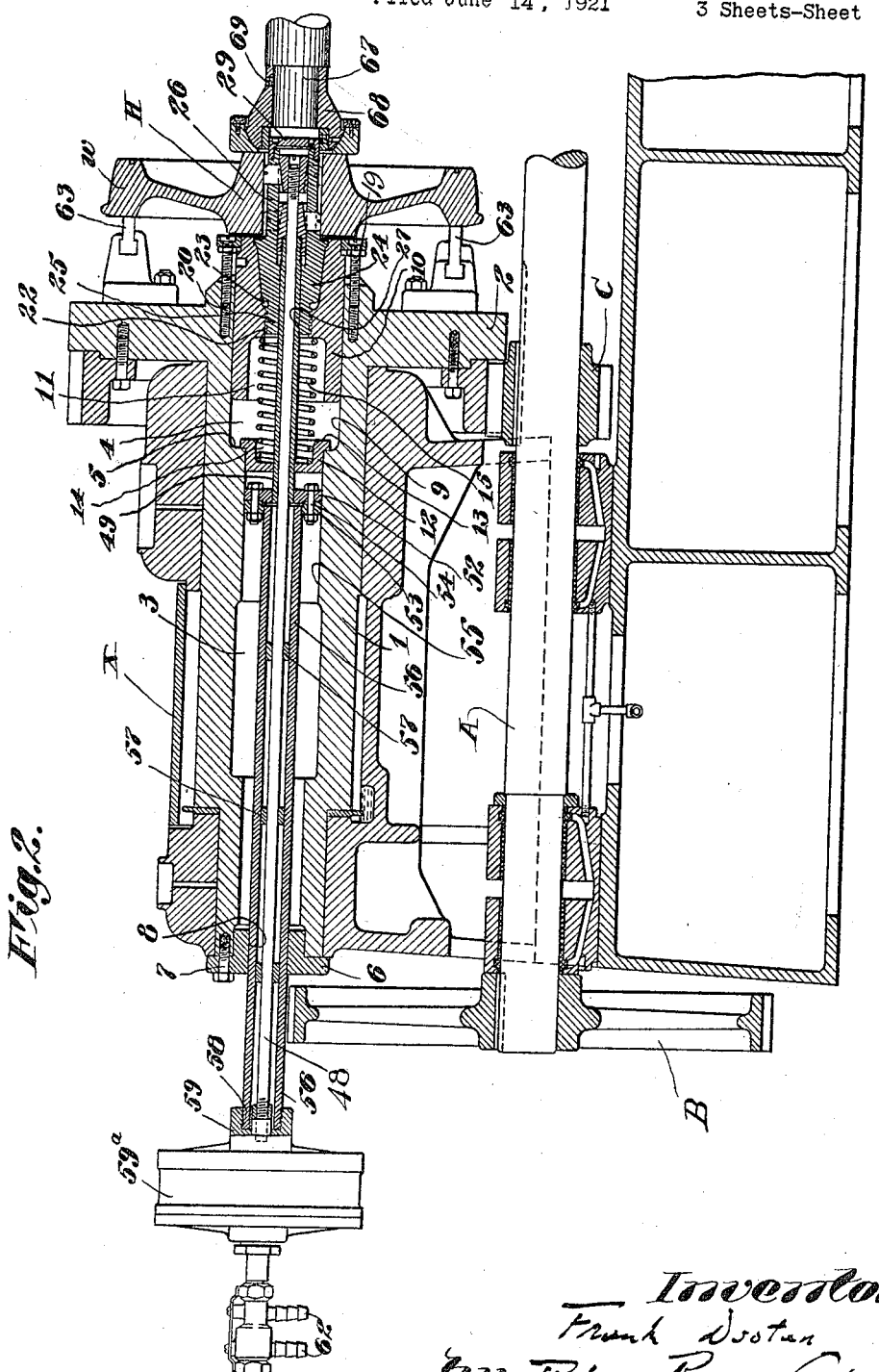

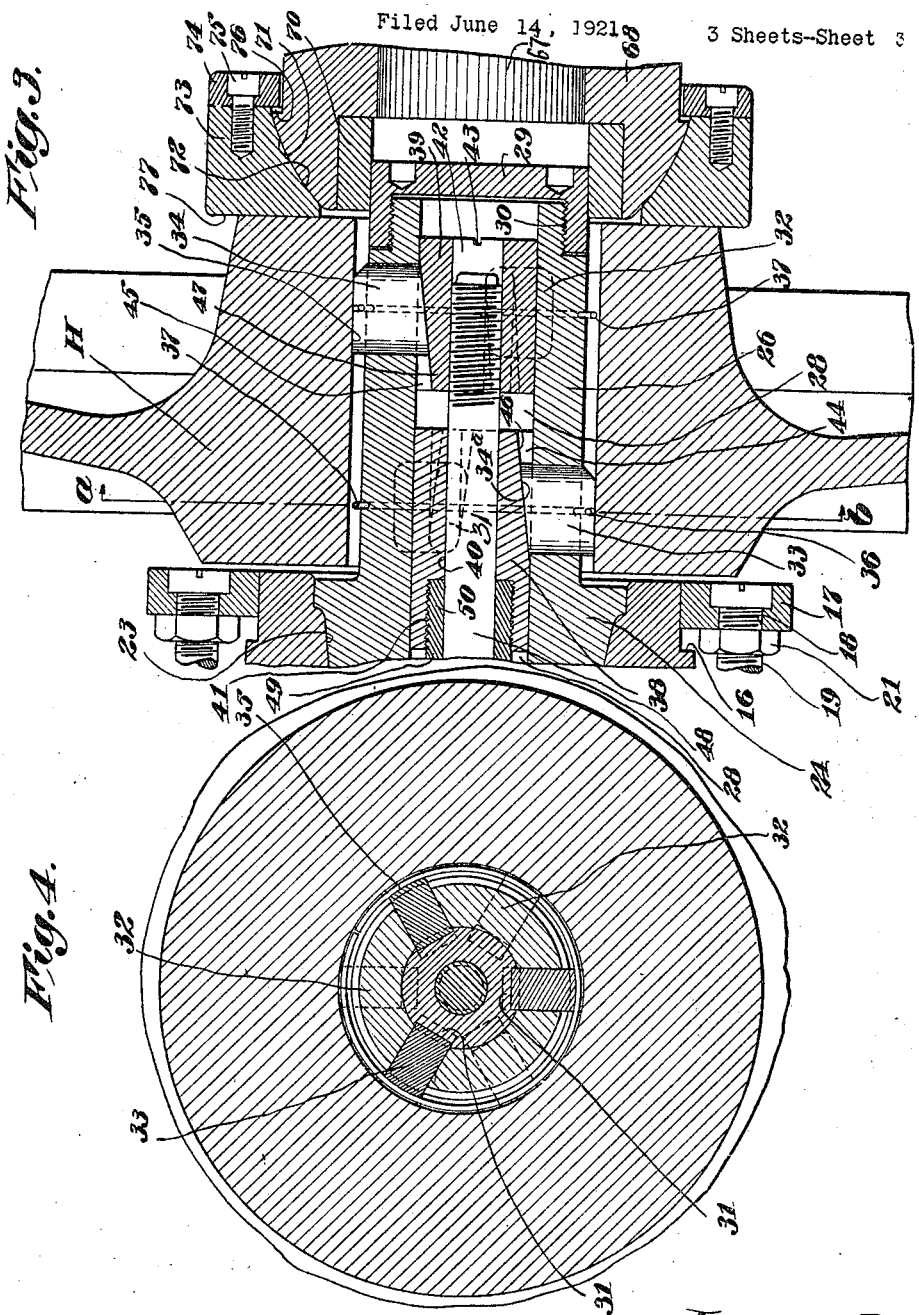

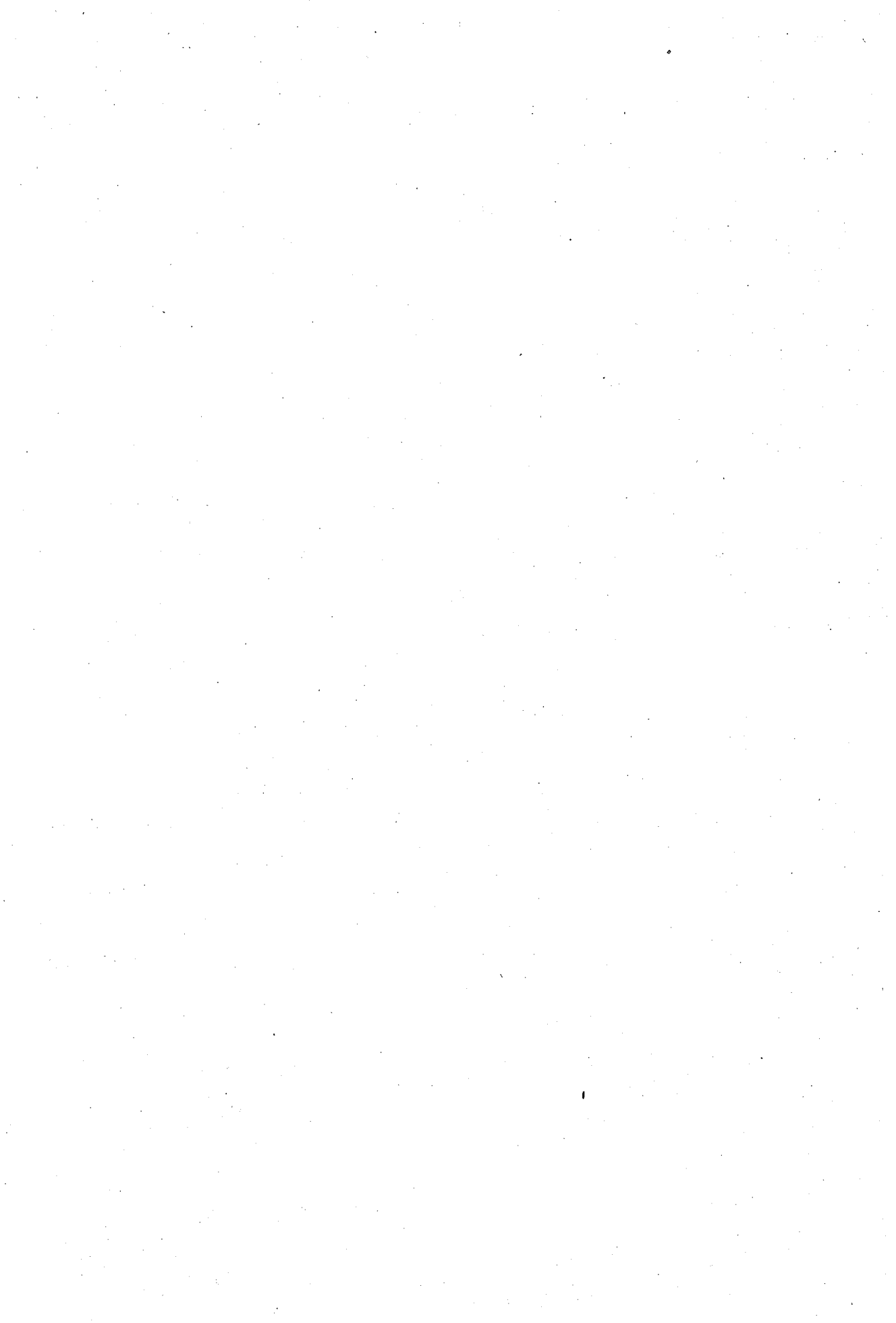

1,522,770

UNITED STATES PATENT OFFICE.

FRANK DUSTAN, OF LUNENBURG, MASSACHUSETTS, ASSIGNOR TO MANNING, MAXWELL & MOORE, INC., OF NEW YORK, N. Y., A CORPORATION OF NEW JERSEY.

LATHE FOR TURNING WHEELS.

Application filed June 14, 1921. Serial No. 477,447.

*To all whom it may concern:*

Be it known that I, FRANK DUSTAN, a citizen of the United States of America, and resident of Lunenburg, in the county of Worcester and State of Massachusetts, have invented new and useful Improvements in Lathes for Turning Wheels, of which the following is a specification.

This invention concerns wheel turning lathes and relates more especially to work centering means for use with such lathes.

Lathes of the general character to which the invention relates are commonly arranged to accommodate wheels in pairs, fixedly mounted on their axles, and are provided with means, engageable with such axles, for centering them, as well as with devices permitting the simultaneous machining of both wheels. When, however, it is desired to turn down the rims of unmounted wheels, such for example as coach, truck or locomotive trailer wheels, it is necessary to provide centering means engageable with the central bore in such wheels.

The principal object of the present invention is to provide means whereby unmounted wheels may properly and rapidly be centered in the lathe and further to provide for the simultaneous machining of a pair of such unmounted wheels without necessitating the mounting of the wheels upon a special mandrel or similar detached device.

As one mode of attaining the desired end, the head and tail stock spindles may each be formed with a longitudinal bar adapted for the reception of means for supporting an expansible centering chuck. Such chuck preferably has substantially smooth work engaging faces whose only function is to retain the work in properly centered position, the driving of the work being accomplished by the employment of driving dogs of any suitable character mounted upon the opposed face plates of the lathe.

These chucks may be arranged for power actuation if desired, as for example, by connecting the relatively movable actuating members thereof to the cylinder and piston respectively of the pneumatic or other fluid pressure motor. The chuck supporting means preferably will be so designed as to permit limited bodily movement of the chuck in an axial direction, and may comprise resilient means tending normally to protrude the chuck proper from the end of the spindle whereby the chuck is permitted to yield during the operation of centering and positioning the work in the lathe.

For securing the work in position for engagement by the driving dogs of the respective face plates, a spacing device may be employed, such device comprising a shaft mounted in a suitable support and co-axial with the lathe spindles. The ends of such shaft may be provided with work engaging shoes, preferably connected to the shaft by ball or equivalent joints, whereby such shoes may adapt themselves to irregularities in the work.

Preferred means whereby the objects of the invention may be carried into effect are illustrated in the accompanying drawings in which,—

Fig. 1 is a fragmentary plan view illustrating a car wheel lathe of a known type having the present improvements applied thereto;

Fig. 2 is a longitudinal cross section through the head stock portion of the lathe of Fig. 1 showing a car wheel as mounted upon the head stock face plate;

Fig. 3 is a fragmentary cross section to larger scale showing the right-hand portion of the device shown in Fig. 2;

Fig. 4 is a transverse cross section on the line *a—b* of Fig. 3; and

Fig. 5 is a section through the chuck operating cylinder.

While in certain of its aspects the present invention is of broader utility, it is illustrated herein as embodied in a coach wheel lathe comprising a head stock X and a tail stock Y, together with two tool rests Z, Z', the head and tail stocks being substantially duplicates one of the other, the tail stock, however, being so arranged as to permit of its movement longitudinally of the bed of the machine and toward and from the head stock, all in the manner common and well known in the art.

In accordance with the present invention, both the head and tail stocks are provided with hollow spindles which are positively driven, in unison one with the other, by suitable connections, including the longitudinally extending drive shaft A provided with the driving gear B, and two pinions, as C, corresponding to the head and tail stocks, respectively. In view of the similarity of the parts, the further description will be confined to one of such spindles, together with associated parts.

One such spindle is indicated at 1, being provided with a face plate 2 which may be integral with the spindle, if desired. The spindle has a longitudinally bore 3, which at that portion of the spindle adjacent the face plate, is somewhat enlarged in diameter, as at 4, thus providing a shoulder 5, such enlarged portion extending entirely through the thickness of the face plate. The opposite end of the spindle may be closed by means of a plate 6, secured thereto by means of bolts 7, such plate having a hub provided with an axial bore 8.

The portion 4 of the bore in the spindle provides a bearing surface 9 with which engages the peripheral surface of a sleeve member 10. This sleeve member, at its inner end, has a cylindrical or cup-like recess 11. Within the smaller portion of the spindle bore is arranged a collar 12 having a flat radial flange 13 which bears against the shoulder 5. The collar 12 provides a cup-like cavity 14, opposed to the cavity 11 in sleeve 10, and seated within said cavities are the opposite ends of a coil spring 15. The spring, as thus arranged, tends normally to push the sleeve 10 out of the bore 4 in the spindle. For limiting the outward movement of the sleeve, the latter is provided with an annular shoulder 16 (Fig. 3) with which cooperates a collar 17. This collar is provided with a plurality of spaced openings 18 through which pass bolts, as 19, the threaded extremities of which engage threaded openings 20 in the face plate 2. The bolts are provided with lock nuts 21 between which and the heads of the bolts the ring 17 is positioned. The ring may thus be adjusted toward and from the outer surface of the face plate whereby to adjustably limit the outward movement of the sleeve 10.

At the point 22 the sleeve is internally screw threaded, and extending outwardly from such threaded portion is a substantially conical socket portion 23. 24 is a support, provided with a cylindrical portion 25 externally screw threaded for engagement with the screw threads 22, and having a portion of substantially conical form which interfits with the conical socket 23. The support 24 is also provided with a substantially cylindrical centrally projecting portion 26 constituting a chuck jaw carrier or work centering device. The support 24 is provided with an axial bore 27, such bore being enlarged where it extends through the cylindrical portion 26, as indicated at 28. The outer end of such enlarged portion may be covered by a cap 29 which is internally screw threaded for engagement with screw threads 30 upon the end of said cylindrical portion.

The cylindrical portion 26 of the support 24 is also provided with two series of radial openings such as 31, 32 respectively. Preferably, each series consists of three openings, spaced approximately 120° apart about the circumference of said portion, and in accordance with the preferred arrangement, these openings are somewhat elongated in an axial arrangement. The openings of the series 31, 32 are adapted to receive work engaging shoes 33, 34, respectively, the shoes of the two series being substantially identical in form but being reversely arranged in the openings. Each of these shoes comprises a block, provided with an inclined or cam surface $34^a$ on one side, and with a curved and substantially smooth work engaging surface 35 on the opposite side. Extending transversely across the work engaging surface of each shoe is a groove 36. The grooves of the shoes of each series serve for the reception of retaining rings such as 37, such rings being snapped into the grooves and serving to prevent the accidental displacement of the shoes from their sockets.

Slidable within the enlarged portion 28 of the bore in the member 26 are a pair of wedge elements 38, 39, respectively. The wedge 38 is provided with a bore 40, one extremity of such bore being enlarged and internally screw threaded, as indicated at 41. The other sleeve member 39 is also provided with an axial bore 42, which may be of substantially uniform diameter, corresponding to the diameter of the bore 40 in the wedge 38, and a portion at least of such bore is internally screw threaded. The outer end of the wedge 39 may, if desired, be provided with a transverse slot 43 for engagement by a screw driver or similar tool whereby such sleeve may be rotated. The wedges 38 and 39 are each provided with a plurality of longitudinally extending external slots 44, 45, respectively, such slots being spaced at equal distances about the peripheries of such sleeves and corresponding in number to the number of shoes in each of the series 31, 32 above described. The bottom walls of the slots 44, 45 are inclined, as indicated at 46, 46 respectively, and the wedges are so arranged within the bore 28 that such inclined faces are oppositely directed as indicated in Figure 3. The inclined surfaces 46, 46 engage the cam faces $34^a$ of the shoes of the respective sets, and by relative movement of the wedges 38, 39, the shoes of the two series may be simultaneously projected outwardly from the portion 26 of the support 24.

The threaded portion of the wedge 39 engages the screw threaded extremity of a rod 48, such rod extending rearwardly through the support 24 and slidably fitting within a sleeve 49. The sleeve 49, at its extremity 50, is externally screw threaded for engagement with the screw threads 41 of the wedge 38. At its opposite end, the sleeve 49 has secured thereto, or integral therewith, a plate or flange 52. Attached to the flange or plate 52 by means of bolts 54, or in other suitable manner, is a collar 53. The collar 53 is attached to, or integral with, the end of a sleeve 56 of somewhat larger diameter than the sleeve 49, and the collar 53 and flange 52 have sliding engagement with the interior surface 55 of a portion of the bore 3 of the spindle. The sleeve 56 passes through the opening 8 in the collar 6, and is guided for sliding movement thereby. For suitably supporting the rod 48 within the enlarged sleeve 56, bearing rings 57 may be arranged within the latter. At its outer end, beyond the collar 6, the sleeve 56 has secured thereto at the point 58, a boss 59, forming an element of a pressure cylinder 59$^a$. Within such cylinder is a piston 60 having a piston rod 61 secured in any desired manner to the end of the rod 48. Fluid may be admitted to the cylinder 59$^a$ in any desired manner, as for example by the device indicated generally at 62 and comprising suitable inlet and outlet passages which may be controlled by manual means of any known type and not herein specifically disclosed.

The face plate 2 is indicated as provided with work engaging and driving dogs 63 which may be of any usual and desirable type. A supporting bracket is indicated at 64 (Fig. 1), such bracket being arranged between the head and tail stocks of the lathe and mounted upon the lathe bed or frame. The support 64 is provided with a guide or bearing 65 within which is arranged a shaft 66. This shaft is rotatably mounted in such bearing, and is arranged for free sliding movement in a longitudinal direction,—such shaft being coaxial with the spindle 1. At opposite ends, the shaft 66 is reduced in diameter, as indicated at 67, and mounted upon such reduced portions are the head members 68. As these head members are of substantially identical construction, but one end thereof need be specifically described.

Each head member 68 is secured to the reduced portion 67 of the shaft by means of a set screw 69, or any other suitable manner, and at its outer end is provided with an internal bearing ring 70 (Fig. 3) which may be of hardened steel or other suitable wear resistant material. The internal diameter of the said ring is such as to permit it to fit snugly over the cap 29 previously described, such ring thus serving as a support for the cap and for the centering devices comprising the support 24 and associated parts. The outer surface of the head member 68 is spherically curved, as indicated at 71, and engaging such surface is the spherical internal surface 72 of a ring 73. For retaining the ring 73 in position, a collar 74 is secured thereto by means of bolts 75, such collar overlapping a shoulder 76 upon the outer surface of the head 68. The end of the ring 73 provides a surface 77 normally arranged substantially perpendicular to the axis of the shaft 66, but by reason of the spherical surfaces 71 and 72, such ring may be moved universally within limits, whereby to adapt its end face 77 to accommodate itself to irregularities or eccentricities in work mounted upon the centering device comprising the shoes 33, 34. A wheel W is indicated as mounted in the lathe, the end of the hub H of such wheel contacting with the surface 77 of the ring 73, and the bore in such hub taking over the shoes 33, 34 and being centered thereby. The dogs 63 are also shown as contacting with the outer portion of such wheel whereby to impart movement of rotation thereto.

In the employment of the mechanism described, it being assumed that the tail stock of the lathe has been retracted and that the shaft 68 lies substantially midway between the head and tail stocks, and that the pneumatic cylinders have been so actuated as to cause relative movement of the respective rods 48 and sleeves 49 whereby to retract the shoes 33, 34, the lathe is ready for the reception of work. A wheel such as $w$ is now placed over the cylindrical portion 26 of the support 24 of the head stock, and in this connection it may be noted that the action of the spring 15 is such as normally to project the sleeve 10 with the support 24 and the parts carried thereby outwardly and away from the face plate. The wheel having been placed over the centering device, the pneumatic cylinder is operated whereby the shoes are caused to be projected from the support 24, thus properly centering the wheel by means of its axial bore. The wheels having been placed upon the centering devices of both the head and tail stocks, and having been centered, the tail stock is moved toward the head stock. During such movement, that one of the rings 73 which is nearest thereto will be engaged by the work carried by the tail stock, and such ring by reason of its universal mounting, will come into firm engagement with the end of the wheel hub. As the tail stock is now further moved, the shaft 66 will be moved longitudinally, carrying the other ring 73 into contact with the work mounted upon the head stock. During such movement, the caps 29 enter within the rings 70, and as the tail stock continues this movement, the sleeve members 10 may give inward slightly, against the stress of their respective springs 15, until the work has been brought into driving engagement with the dogs 63 of the head and tail stocks. The tail stock is now fixed in this position and the lathe is ready for operation. The operation of removing the work from the lathe is sufficiently obvious to require no detail explanation.

By the above described arrangement it is evident that the lathe is rendered capable of simultaneously operating upon two detached wheels which may be properly and rapidly centered by automatic means, and which are firmly and securely held in driving relationship against the driving dogs carried by the face plate.

While specific details of the mechanism have been hereinabove described, it is evident that in many of such details changes in the size or proportion as well as rearrangements of parts might well be made without in any manner departing from the spirit of the invention.

Although I have illustrated and described only a single form of this invention I am aware of the fact that modifications can be made therein without departing from the scope of the invention as expressed in the claims.

Having thus described the invention in a preferred embodiment of the same, together with a mode of use of the same, what I claim and desire to secure by Letters Patent of the United States is:

1. A lathe having a hollow spindle, a supporting device slidable therein, a work centering chuck carried by said supporting device and having two sets of jaws for engaging the work at different points in its length, said lathe being equipped with means tending constantly to move said device longitudinally of the spindle, and longitudinally movable means for moving said jaws radially.

2. A lathe having a spindle provided with a face plate, a work centering chuck movably supported by said spindle comprising two sets of radial jaws spaced apart longitudinally, resilient means normally tending to impart bodily movement of said chuck in a direction outwardly from the face plate and means for moving said jaws outwardly to engage the inside of a hollow body.

3. A wheel lathe comprising a hollow spindle, a sleeve member slidable therein, a stop shoulder for limiting the movement of said sleeve in one direction, a spring seated within said spindle and bearing against one end of said sleeve, a chuck supporting device mounted in said sleeve, and outwardly movable shoes for gripping the inside of the work carried by said supporting device.

4. A lathe having a hollow spindle, a member slidable therein, stop means for limiting the movement of said member, resilient means tending to hold said member in engagement with said stop means, and a work positioning chuck supported by said slidable member comprising two sets of jaws having outer work engaging surfaces, two blocks having oppositely inclined surfaces for engaging the jaws, and means for moving one block toward the other to project all the jaws.

5. A lathe having a hollow spindle and a centrally apertured face plate, a sleeve slidable longitudinally of said spindle and within the opening in said face plate, a stop member engageable by one end of said sleeve whereby to limit the movement thereof outwardly from the face plate, an abutment member seated within said spindle, a coil spring interposed between said abutment and the opposite end of said sleeve, a support carried by the sleeve and projecting beyond the face plate and work centering dogs carried by the support beyond the face plate and movable outwardly in a radial direction.

6. A lathe having a hollow spindle, a collar seated therein, said collar having a cup-like cavity in one face thereof, a substantially cylindrical member slidably fitting the interior of said spindle, said member having a cavity in one end thereof, a coil spring within said spindle and having its ends seated in the cavities in said collar and cylindrical member respectively, stop means for limiting the movement of the latter member under action of the spring, and means supported by the cylindrical member for centering the work.

7. A lathe having a hollow spindle, a hollow sleeve member slidable therein, and having a centrally projecting portion, work engaging shoes movable through the sides of said extending portion, wedge elements in said extending portion for moving the shoes outwardly to grip the interior of a hollow piece of work, and means for operating said wedge elements.

8. A lathe having a hollow spindle, a hollow sleeve member slidable therein at the end, a support carried by the sleeve member and having a centrally projecting portion extending beyond the spindle and sleeve member, work engaging shoes radially movable through the sides of said extending portion, opposite wedge elements in said extending portion for moving the shoes radially outwardly to grip the interior of a hollow piece of work, and means passing through the extending portion for operating said wedge elements.

9. A lathe having a pair of aligned spindles, work centering means carried by each of said spindles, a shaft interposed between the respective centering means and in substantial alignment with said spindles, and work engaging means mounted upon either end of said shaft and having universally adjustable engaging means at both ends.

10. A lathe having a hollow spindle, a support slidably mounted therein, resilient